Figure 1:
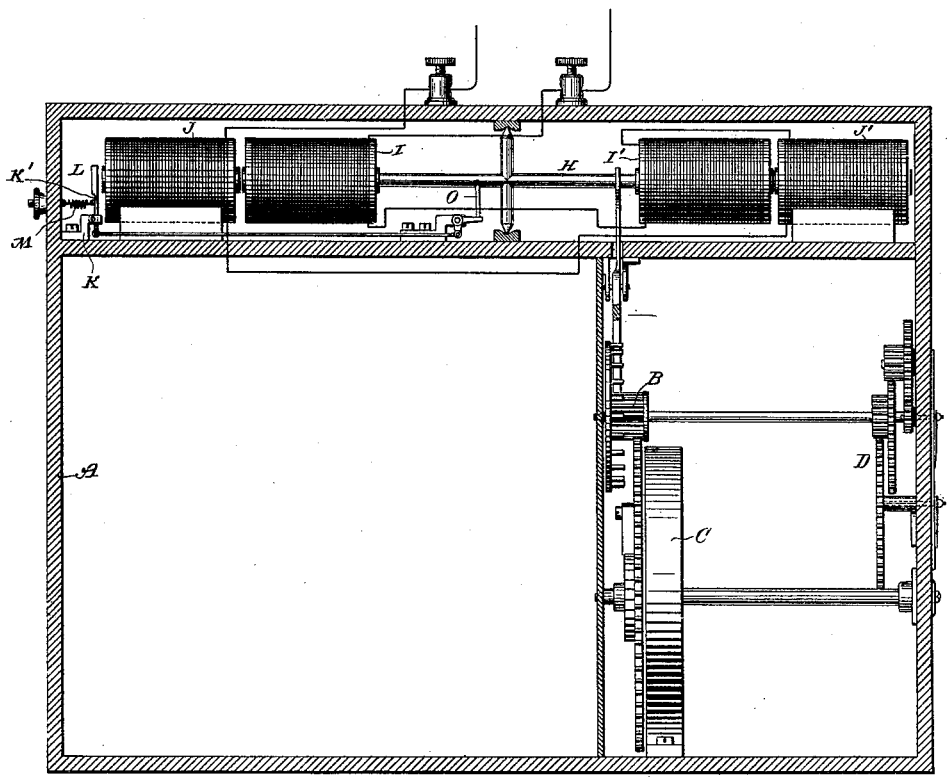

(No Model.) 2 Sheets—Sheet 1.

J. H. BARNARD.
ELECTRIC METER.

No. 429,751. Patented June 10, 1890.

Witnesses:
Raphael Netter
M. G. Tracy.

Inventor
John H. Barnard
by
Duncan, Curtis & Page.
Attorneys.

(No Model.) 2 Sheets—Sheet 2.

J. H. BARNARD.
ELECTRIC METER.

No. 429,751. Patented June 10, 1890.

*Fig. 4* *Fig. 5*

Witnesses:
Raphael Netter
M. G. Tracy

Inventor
John H. Barnard
by
Duncan, Curtis & Page
Attorneys.

UNITED STATES PATENT OFFICE.

JOHN H. BARNARD, OF ASHEVILLE, NORTH CAROLINA.

ELECTRIC METER.

SPECIFICATION forming part of Letters Patent No. 429,751, dated June 10, 1890.

Application filed April 4, 1890. Serial No. 346,547. (No model.)

*To all whom it may concern:*

Be it known that I, JOHN H. BARNARD, a citizen of the United States, residing at Asheville, in the county of Buncombe and State of North Carolina, have invented certain new and useful Improvements in Electrical Meters, of which the following is a specification, reference being had to the drawings accompanying and forming a part of the same.

This invention is an improvement in electrical meters for general use in electrical systems for indicating and recording the current distributed or used in any given circuit or branch thereof.

Broadly considered, the improvement consists in a meter containing a train of wheels impelled by a spring or weight and operating a register and governed by a device operating on the principle of a pendulum, but in which the attractive force of an electric current or a magnet energized thereby is substituted for the attraction of gravitation.

The following is an explanation of the general principle of construction and operation of the governing or controlling feature referred to.

The law governing a simple pendulum acted upon by gravity is expressed by the formula—

$$t = \pi \sqrt{\frac{e}{g}}$$

in which $t$ is the time of one oscillation; $l$, the length of the pendulum; $g$, the attractive force of gravity acting on the pendulum-bob, and $\pi$ stands for the known number 3.1416, the ratio of the diameter to the circumference of a circle. If now a pendulum with a magnetic bob be mounted to oscillate in a horizontal plane, and be properly balanced, gravity will have no appreciable effect upon its movements; but an electro-magnet mounted near the path of oscillation of the bob will produce by its attractive force upon the bob a similar effect to that produced by gravity in the case of the ordinary pendulum; but while the time of oscillation of such a pendulum would not be directly in proportion to the strength of the attracting-magnet, which while below saturation is proportional to the strength of the current, yet by substituting for the bob an electro-magnet of the same size and winding as the attracting-magnet and passing through its coils the same current there will exist between them an attractive force proportional to the square of the current. To express this by formula, let $f$ equal the strength of one magnet and $f'$ equal the strength of the other; then in the equation above given—

$$t = \pi \sqrt{\frac{l}{ff'}}$$

but as $f$ equals $f'$ we have—

$$t = \pi \sqrt{\frac{l}{f^2}} = \frac{\pi \sqrt{l}}{f}$$

so that in such a construction as I have above supposed, since $f$ is directly proportional to the strength of current, the time is inversely and the speed directly proportional to the amount of current passing through the device.

In practice I employ two bobs or magnets on opposite ends of a horizontally-oscillating bar and two attracting-magnets, whereby an even balance is secured and the inertia is more readily overcome, and I use the pendulum to govern the speed of a train of clock-work that is driven by a spring or weight and that operates any suitable registering or recording device.

In applying this meter to general use it will be arranged in a shunt or branch of a main circuit, whereby it will be acted upon by a definite proportion of the current in said mains, as is usual in such cases, and I furthermore provide means for stopping and starting it when necessary, as will be more fully hereinafter set forth.

The construction of a meter of this kind I have illustrated in the accompanying drawings.

Figure 2:
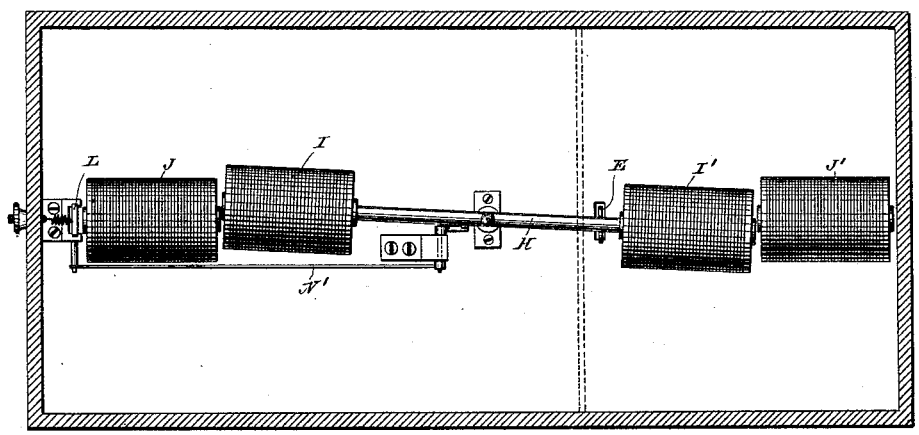
Figure 3:
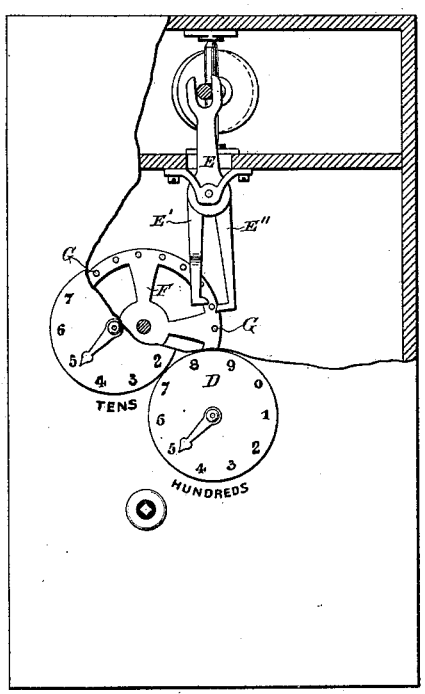
Figure 3:
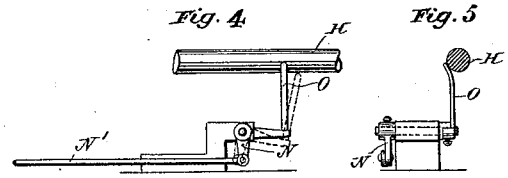
Figure 3:
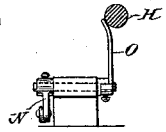

Figure 1 is a side elevation of a complete instrument, the box or case being shown in section. Fig. 2 is a top plan view of the pendulum-governor. Fig. 3 is an end view of the instrument, a portion of the case being broken away to exhibit the escapement-connection with the pendulum. Fig. 4 is a side elevation of a detail for stopping the pendulum. Fig. 5 is another view of the same.

I employ any suitable form of box or case

A, in one part of which is mounted a clockwork B, driven by a spring C or any equivalent therefor. The train drives by suitable gearing the dials D of an indicator or register graduated to the proper scale, and its rate of movement is controlled by means of an escapement-connection with the pendulum, hereinafter described.

I prefer to use some form of dead-beat escapement; but the construction in this respect may be varied in many ways. I have shown an escapement-lever E, with two arms E' E'', the first named being curved or bent to permit the passage of the pins or teeth G on a scape-wheel F. The ends of these arms engage alternately with the teeth G. The opposite end of the lever E is bifurcated and embraces the pendulum-bar H. This bar is pivoted at its center in bearings, which permit a free movement of oscillation in a horizontal plane. Electro-magnets I I' are secured to the opposite ends of the bar H and form the bobs of the pendulum. Magnets J J', exactly like the others, are fixed in face of their poles, and the circuit is led by suitable conductors through all the magnets.

In order to insure the pendulum coming to rest at a point from which it will start when the current begins to pass through the meter, I provide a locking device of the following character. On a bracket or stud K is pivoted a lever K', carrying an armature L in face of the rear end of the core of magnet J. The armature is normally retracted from the magnet by a spiral spring M. Under the pendulum-lever H, and near its pivotal center, is pivoted a bell-crank lever N, one end of which is connected to the lever K' by a light rod or bar N'. The other end carries a pin O, that in its normal position projects up into the plane of oscillation of the pendulum-bar H.

When a current passes through the magnets of the meter, the armature L is drawn toward the magnet J and the end of the pin or arm O is held down out of the plane of the bar H, which is accordingly free to vibrate. When the current is interrupted through the magnets, however, the spring M acts to throw the end of the arm O up into the path of the bar H, and said bar is thereby retained in one of its extreme positions. The end of the arm O is beveled or made flexible, so that in rising it forces the bar H over, even slightly beyond its normal limit of oscillation, to insure its starting properly when the current again flows.

This meter may be equipped with such cut-out mechanism as may be considered necessary or desirable of the kind employed with other meters of this character. It may also contain resistance coils or shunts for varying its capacity, and other accessories which are well known and commonly used with such devices.

The amplitude of the vibration of the pendulum, it will be seen, may be very small, whereby greater accuracy is secured, while at the same time a sufficient oscillation of the escapement is secured by the character of its construction and its location with respect to the center of oscillation.

From the above description it is evident that the rate of movement of the train of wheels will be determined by the number of oscillations of the pendulum, which, as above shown, is dependent upon the strength of the current in the magnets.

Having now described my invention, what I claim is—

1. The combination, in a meter, with a train of wheels, an impelling device for driving the same, and a registering apparatus connected therewith, of a governing-pendulum comprising a horizontally-oscillating bar with an electro-magnet for a bob and an electro-magnet energized by the current to be measured acting upon said pendulum, as set forth.

2. A controlling device for electrical meters, consisting of a horizontally-pivoted pendulum-bar having an electro-magnet at its end or ends and stationary electro-magnets in face of the same, said magnets being of equal power and included in or connected with the circuit in which the current is to be measured, as set forth.

3. The combination, in an electrical meter, with a driven train of wheels, a registering device, and an escapement, of a horizontally-pivoted pendulum-bar, electro-magnets at its ends, and fixed electro-magnets in face of the same, said magnets being of equal power and included in or connected with the circuit in which the current is to be measured, as described.

4. The combination, in an electrical meter, with a driven train of wheels and a registering device, of a horizontally-oscillating governing-pendulum acted upon by the attractive force of the current to be measured and a locking device controlled by the said current and adapted to lock or retain said pendulum in one of its extreme positions of oscillation when the current ceases to flow, as set forth.

5. The combination, in an electric meter, with a driven train of wheels and a registering device, of a horizontally-pivoted bar, an electro-magnet at its end, a fixed magnet acting thereon, a detent normally in the path of the bar, and an armature for holding the same out of the path of the bar and releasing it when the current ceases to flow through the meter, whereby the bar will be locked or retained at the end of its swing on the interruption of the current, as set forth.

6. The combination, in an electric meter, with a train of wheels, a spring for driving the same, a registering device operated thereby, and an escapement, of a horizontally-pivoted bar, electro-magnets at its ends, fixed electro-magnets in circuit therewith, a detent or arm normally in the path of the bar, a pivoted armature in the field of one of the fixed magnets, and connections between the same and the detent for permitting said detent to engage with the bar and retain it in or near one of its extreme positions when the current through the meter ceases, as set forth.

7. A controlling or governing pendulum for electric meters, substantially as described, consisting of a horizontal pendulum-bar with an electro-magnet forming the bob, in combination with a fixed electro-magnet of equal power with the other and in the same electric circuit and placed in line with the center of oscillation of the pendulum, as and for the purpose set forth.

JOHN H. BARNARD.

Witnesses:
 DUFF MERRICK,
 WM. W. MERRELL.